Feb. 20, 1962     R. W. KROGER     3,021,690
VEHICLE HEAT EXCHANGER FOR USE WITH A REFRIGERATOR, AIR
CONDITIONER OR THE LIKE
Filed Sept. 10, 1958
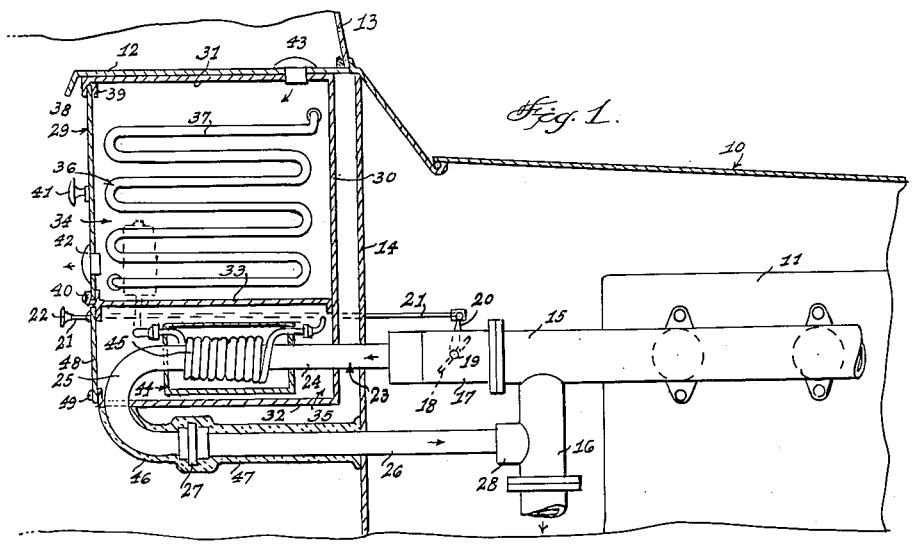
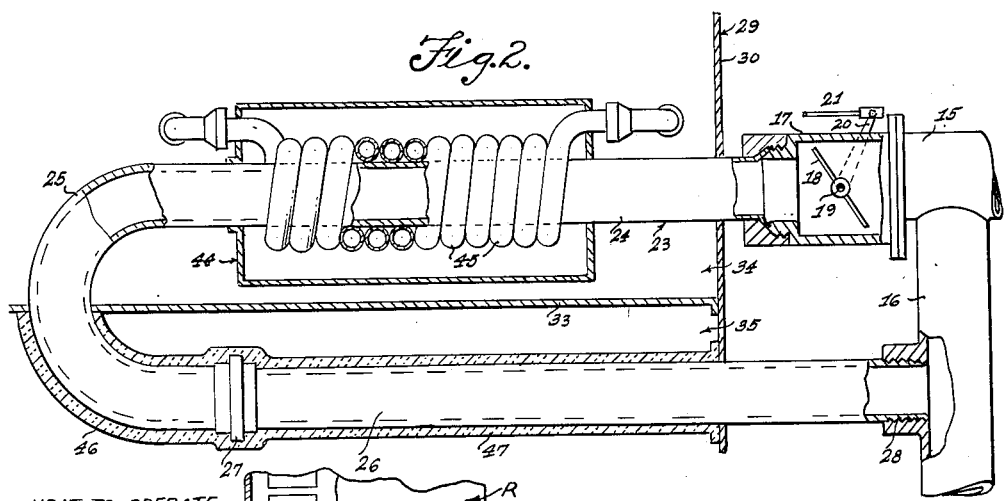
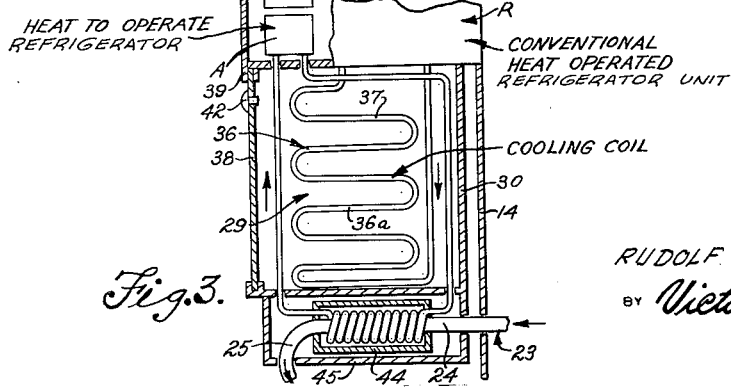
INVENTOR.
RUDOLF WILLIAM KROGER
BY *Victor J. Evans & Co.*
ATTORNEYS

United States Patent Office

3,021,690
Patented Feb. 20, 1962

3,021,690
VEHICLE HEAT EXCHANGER FOR USE WITH A REFRIGERATOR, AIR CONDITIONER OR THE LIKE
Rudolf William Kroger, Camp Douglas, Wis.
Filed Sept. 10, 1958, Ser. No. 760,173
4 Claims. (Cl. 62—238)

This invention relates to a vehicle, and more particularly to a heat exchanger adapted to be used in conjunction with a refrigerator and air conditioner for a vehicle.

The object of the invention is to provide a heat exchanger for use with a refrigerator and air conditioner and wherein the heat exchanger is adapted to be mounted in a vehicle such as an automobile whereby heat from the exhaust of the engine can be used for energizing or actuating a cooling and refrigerating mechanism so that cool air can be provided for any desired purpose.

Another object of the invention is to provide a vehicle heat exchanger for use with a conventional cooling and refrigerating mechanism and whereby the heat exchanger of the present invention operates off of the exhaust heat from the engine of the vehicle, and wherein the present invention can either be used in conjunction with a mechanism for generating cool air that is adapted to be used for maintaining the interior of the vehicle at a desired comfortable temperature as for example when the vehicle is being operated in hot weather or climates which are warm.

A further object of the invention is to provide a heat exchanger for use with a vehicle refrigerator and air conditoner which is extremely simple and inexpensive to manufacture.

Other objects and advantages will be apparent during the course of the following description.

In the accompanying drawings, forming a part of this application, and in which like numerals are used to designate like parts throughout the same.

FIGURE 1 is a sectional view illustrating the vehicle heat exchanger of the present invention for use with a refrigerator and air conditioner.

FIGURE 2 is an enlarged vertical sectional view illustrating certain constructional details of the present invention.

FIGURE 3 is a diagrammatic view, with parts broken away and in section.

Referring in detail to the drawings, the numeral 10 indicates a portion of a conventional vehicle such as an automobile, and there is further provided the usual engine 11, and dashboard 12 as well as windshield 13. The numeral 14 indicates the usual paneling in the vehicle, and the numeral 15 indicates an exhaust line which is connected to the engine 11. A branch line 16 is connected to the exhaust line 15, and the branch line 16 leads to the muffler and exhaust pipe of the vehicle.

There is further provided a hollow support member 17 which is connected to the exhaust line 15, and a movable disk or valve member 18 is movably supported in the member 17 by means of a pivot pin 19. A lever 20 is connected to the valve member 18, and a rod 21 is connected to the lever 20, there being a knob 22 on the front end of the rod 21, FIGURE 1. Thus, by manually moving the knob 22, the position of the valve member 18 can be regulated as desired so that the amount of exhaust gas passing through the support member 17 or through the branch line 16 can be regulated or controlled as desired.

The numeral 23 indicates a conduit which includes a straight section 24 that is connected to the support member 17, and the conduit 23 further includes a gooseneck or curved section 25, there being a pipe section 26 connected to the curved section 25 by means of a union 27.

The pipe section 26 is connected to the branch line 16 as at 28.

There is further provided a hollow housing which is indicated generally by the numeral 29, and the housing 29 is mounted below the dashboard 12 as shown in FIGURE 1. The housing 29 includes a vertically disposed back wall 30, a horizontally disposed top wall 31, and a horizontally disposed bottom wall 32. Arranged in the housing 29 is a horizontally disposed partition 33 which defines in the housing upper and lower compartments 34 and 35 respectively. A cooling and refrigerating mechanism of conventional construction as indicated by the numeral 36 is arranged in the upper compartment 34, and the cooling and refrigerating mechanism 36 includes the usual coil 37 as well as the other well known parts or apparatus. The cooling and refrigerating mechanism 36 is of the type that is actuated by heat from the vehicle engine exhaust system, and the mechanism 36 includes a coil 36a which is the cooling coil for the conventional heat operated refrigerator unit as indicated by the letter R. In FIGURE 3 the letter A indicates the heating unit for operating the refrigerator unit.

Arranged contiguous to the upper compartment 34 is a sliding door 38 which is supported by tracks 39 and 40. A handle or knob 41 is connected to the sliding door 38, so that by manually moving the handle 41, the door 38 can be moved back and forth in the tracks 39 and 40 as for example when a person desires to gain access to the upper compartment to store foodstuffs, beverages or the like therein which are to be kept cool.

As shown in FIGURE 1 there is further provided a plurality of removable plugs 42 and 43. When the device is being used in conjunction with a refrigerator, the plugs 42 and 43 are in the position of FIGURE 1. However, when the apparatus is to be used in conjunction with a vehicle air conditioner, the plugs 42 and 43 are removed so that cool air can circulate out through these openings in order to cool the interior of the vehicle whereby a person in the vehicle can travel in greater comfort. When the apparatus is being used as part of an air conditioner, a suitable fan can be provided for helping to circulate the cool air in the desired direction or manner.

Positioned in the lower compartment 35 is a hollow casing 44, FIGURE 2, and the straight section 24 of the conduit 23 extends through the casing 44. The numeral 45 indicates tubing which is arranged in coil formation and which surrounds the straight section 24 in heat exchange therewith, and the coiled tubing 45 is operably connected to the cooling and refrigerating mechanism 36 in the upper compartment 34. Thus, it will be seen that the hot exhaust gases passing through the conduit 23 will give up their heat to the coil tubing 45 so that this heat can be used for actuating the refrigerating and air conditioning mechanism 36 in the usual manner.

The numerals 46 and 47 indicate insulation which is arranged on a portion of the curved section 25 and on the pipe section 26, FIGURE 2.

There is further provided a front plate member 48 which is arranged contiguous to the front of the lower compartment 35, and the plate 48 is held in place by securing elements such as the screws 49. Thus, by removing the screws 49, the plate 48 can be removed, as for example when access is to be gained to the lower compartment 35 to perform repair work or the like.

From the foregoing, it is apparent that there has been provided an apparatus which is especially suitable for use as part of either a refrigerator or air conditioner in a vehicle. According to the present invention foodstuffs, beverages or the like can be kept cool when the device is being used as part of a refrigerator. Or, the device can be used as part of an air conditioner so that persons may ride or remain in a vehicle even during hot weather with comfort.

It will be seen that according to the present invention the exhaust line 15 is connected to the engine 11 and with the parts arranged as shown in the drawings, it will be seen that the operator or person in the vehicle can manually move the knob 22 so as to arrange the valve member 18 at the desired angle. Thus, the amount of hot exhaust gas passing from the exhaust line 15 into the conduit 23 can be controlled or regulated. This hot exhaust gas which enters the straight section 24 of the conduit 23 gives up its heat to the coiled tubing 45 and this heat which is transmitted to the tubing 45 serves to actuate the refrigerating and cooling mechanism 36 which is of conventional construction. The mechanism 36 thus can be used for cooling foodstuffs, beverages or the like which may be arranged in the upper compartment 34 of the housing 29, and suitable shelves or the like can be provided for holding the foodstuffs or beverages or other material. After the exhaust gases give up their heat to the coiled tubing 45, the exhaust gases pass through the curved section 25 of the conduit 23 and then pass through the pipe section 26 and then out through the branch line 16 to the vehicle muffler and exhaust pipe.

Thus, it will be seen that there has been provided a means for utilizing the heat of the exhaust which is ordinarily wasted and this heat is used for a useful purpose, namely for providing a cooling effect to the air or refrigerator apparatus. The valve member 18 can be positioned in a vertical plane by properly moving the knob 22 so that no exhaust gas flows through the conduit 23, whereby all of the exhaust gas will flow directly from the exhaust line 15 through the branch line 16 and then out to the vehicle exhaust pipe.

By removing the plugs 43 and 42, the cool air can be permitted to circulate into the interior of the vehicle as for example when the device is functioning as an air conditioner. When the device is being used as part of a refrigerator the plugs 42 and 43 are left in place as shown in FIGURE 1 so that the interior of the housing 29 can be used as a refrigerator. The door 38 can be slid open by means of the handle 41 so as to gain access to the interior of the upper compartment in which is arranged the articles being cooled. The plate 48 can be removed so as to permit access to the lower compartment so that repairs and replacements can be readily made.

The parts can be made of any suitable material and in different shapes or sizes.

As previously stated, the apparatus of the present invention uses a conventional refrigeration system of the type which is operated by heat. Suitable insulation is provided for helping to prevent heat loss where desired or required.

The unit of the present invention is energized by the exhaust flame from the manifold of the vehicle motor as shown in the drawings. The member 18 may be made of heat-resistant material and the member 18 can be properly positioned so as to control the amount of heat being supplied, or else the heat can be entirely shut off. The insulation 46 and 47 prevents the heat from entering the interior of the vehicle. The coils 45 serve to collect the heat from the conduit 23 so as to actuate the refrigerating mechanism. The housing 29 and other parts are arranged so that there will be no interference with the vehicle instrument panel, radio or glove compartment, and the housing may be arranged just above the hump on the floor of the vehicle. According to the present invention, a means is provided for utilizing a refrigeration apparatus of the type which is energized by a gas flame. The refrigeration apparatus is of conventional construction and for example is similar to that shown in prior Patent No. 1,983,056 or No. 2,592,712 and no claim is made herein to the particular structure of the refrigerating apparatus. According to the present invention there is provided an improved and novel means for arranging and utilizing such a conventional refrigeration apparatus in a vehicle such as an automobile so that instead of using an electrical means or an open flame to supply the heat for actuating the refrigeration apparatus, there is provided a means for utilizing the exhaust heat of a vehicle engine to energize the conventional refrigeration apparatus.

Thus, it will be seen that there has been provided a refrigerating and cooling system which is operated by an open gas flame. The exhaust heat from the automobile motor leads into the heating chamber of the cooling element and the entire unit can serve as either a small icebox which can function as a container for picnic lunches, cold drinks, as well as a tray for ice cubes and ice cream, or else it can be used as an air conditioner for providing greater comfort in the interior of the vehicle such as the automobile. The door 29 can be opened when the device is being used as an air conditioner. The various conduit system which has the exhaust gases passed therethrough is made absolutely airtight so that no carbon monoxide can escape into the interior of the car. The parts are arranged so that there will be no interference with leg room or space.

The coil 45 may be made of thin walled copper tubing and suitable bushings and fittings can be used whenever needed. The parts such as the member 18 are arranged so as to prevent any back pressure.

Minor changes in shape, size and rearrangement of details coming within the field of invention claimed may be resorted to in actual practice, if desired.

I claim:

1. In a motor vehicle, an engine, an exhaust line connected to said engine, a branch line connected to said exhaust line, a hollow support member connected to said exhaust line, a movable valve member arranged in said support member, said valve member being supported on a pivot pin, a manually operable mechanism including a rod, lever and knob for moving said valve member, a conduit connected to said support member and said conduit including a straight section and a curved section, a pipe section extending between said curved section and said branch line, said vehicle further including a dashboard, a hollow housing mounted below said dashboard and including a vertically disposed back wall, horizontally disposed spaced parallel top and bottom walls, a horizontally disposed partition arranged in said housing and defining upper and lower compartments in said housing, a heat actuated mechanism arranged in said upper compartment, a sliding door arranged adjacent the front of the housing, a casing positioned in said lower compartment, the straight section of said conduit extending through said casing, and tubing in coiled formation positioned in said casing and surrounding the straight section of said conduit, said tubing being connected to the heat actuated mechanism in the upper compartment.

2. The structure as defined in claim 1 and further including a plurality of removable plugs connected to said sliding door and to the top wall of said housing.

3. The structure as defined in claim 1 and further including insulation on a portion of the curved section of the conduit, insulation also on a portion of the pipe section, and a removable front panel connected to said housing adjacent said lower compartment.

4. In a device of the character described, an exhaust line, a branch line connected to said exhaust line, a support member connected to said exhaust line, a movable valve member arranged in said support member, a manually operable rod for moving said valve member, a conduit connected to said support member, said conduit including a straight section and a curved section, a pipe section extending between said curved section and said branch line, a hollow housing including a vertically disposed back wall, horizontally disposed spaced parallel top and bottom walls, a horizontally disposed partition arranged in said housing and defining upper and lower compartments therein, a heat actuated mechanism arranged in said upper compartment, a sliding door arranged adjacent the front of the housing, a casing positioned in said lower compartment, the straight section of said conduit extending through said casing, tubing in coiled formation positioned in said casing and surrounding the straight section of said conduit, said tubing being connected to the heat actuated mechanism in the upper compartment, removable plugs connected to said sliding door in the top wall of said housing, insulation on a portion of the curved section of the conduit and also on a portion of the pipe section, and a removable front panel adjacent the front of the lower compartment.

References Cited in the file of this patent

UNITED STATES PATENTS

| | | |
|---|---|---|
| 2,050,381 | Rogers | Aug. 11, 1936 |
| 2,213,016 | Perkins | Aug. 27, 1940 |
| 2,327,451 | Perrine | Aug. 24, 1943 |
| 2,495,350 | Smith | Jan. 24, 1950 |
| 2,512,077 | Walker | June 20, 1950 |
| 2,592,712 | Knoy | Apr. 15, 1952 |
| 2,780,073 | Curry | Feb. 5, 1957 |
| 2,783,622 | Bourassa | Mar. 5, 1957 |